(12) United States Patent
Schumacher (10) Patent No.: US 7,096,738 B2
(45) Date of Patent: Aug. 29, 2006

(54) IN-LINE ANNULAR SEAL-BASED PRESSURE DEVICE

(75) Inventor: Mark Schumacher, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 65 days.

(21) Appl. No.: 10/804,935

(22) Filed: Mar. 18, 2004

(65) Prior Publication Data

US 2005/0204822 A1   Sep. 22, 2005

(51) Int. Cl.
*G01L 9/12* (2006.01)
*G01F 1/37* (2006.01)

(52) U.S. Cl. ..................... 73/718; 73/861.52
(58) Field of Classification Search ............... 73/49.1, 73/861.63, 718, 861.52
See application file for complete search history.

(56) References Cited

U.S. PATENT DOCUMENTS

| | | | | |
|---|---|---|---|---|
| 4,064,549 | A | 12/1977 | Cretzler | 361/283 |
| 4,141,252 | A | 2/1979 | Lodge | 73/724 |
| 4,398,542 | A | 8/1983 | Cunningham et al. | 128/675 |
| 4,424,713 | A | 1/1984 | Kroninger, Jr. et al. | 73/718 |
| 4,483,196 | A | 11/1984 | Kurtz et al. | 73/730 |
| 4,484,479 | A * | 11/1984 | Eckhardt | 73/861.47 |
| 4,671,109 | A | 6/1987 | Halmi | 73/198 |
| 4,763,527 | A * | 8/1988 | Raftis | 73/730 |
| 4,772,983 | A | 9/1988 | Kerber et al. | 361/283 |
| 4,806,783 | A | 2/1989 | Anderson | 307/118 |
| 4,825,876 | A | 5/1989 | Beard | 128/675 |
| 4,884,452 | A * | 12/1989 | Kaiser | 73/730 |
| 5,505,092 | A * | 4/1996 | Kowalski | 73/730 |
| 5,602,339 | A | 2/1997 | Wareham | 73/730 |
| 5,672,832 | A * | 9/1997 | Cucci et al. | 73/861.52 |
| 6,038,961 | A * | 3/2000 | Filippi et al. | 92/98 R |
| 6,367,333 | B1 * | 4/2002 | Bullister et al. | 73/715 |
| 6,393,919 | B1 * | 5/2002 | Ohji et al. | 73/708 |
| 6,487,912 | B1 | 12/2002 | Behm et al. | 73/753 |
| 6,502,467 | B1 * | 1/2003 | Fincke | 73/861.63 |
| 6,536,287 | B1 * | 3/2003 | Beekhuizen et al. | 73/718 |
| 6,575,040 | B1 | 6/2003 | Dietrich | 73/756 |
| 6,604,054 | B1 | 8/2003 | Lipscomb et al. | 702/47 |
| 6,619,141 | B1 * | 9/2003 | Danninger | 73/861.63 |
| 6,628,396 | B1 | 9/2003 | Gul | 356/437 |
| 6,640,641 | B1 * | 11/2003 | Benestad | 73/718 |
| 6,725,731 | B1 * | 4/2004 | Wiklund et al. | 73/861.52 |
| 6,813,964 | B1 * | 11/2004 | Clark et al. | 73/861.52 |
| 6,843,139 | B1 * | 1/2005 | Schumacher et al. | 73/861.52 |
| 6,910,388 | B1 * | 6/2005 | Jones | 73/861.63 |
| 6,957,588 | B1 * | 10/2005 | Kicher et al. | 73/861.52 |

(Continued)

OTHER PUBLICATIONS

Hayes, D.G.; Gregory, I.A.; and Beck, M.S.; "Velocity Profile Measurement in Oil/Gas Flows" IEEE of Electrical Engineers, 1995, pp. 1-6.

(Continued)

*Primary Examiner*—Edward Lefkowitz
*Assistant Examiner*—George P Bonanto
(74) *Attorney, Agent, or Firm*—Westman, Champlin & Kelly, P.A.

(57) ABSTRACT

A pressure sensor for measuring a pressure of a process fluid includes a vessel, an electrode and a diaphragm. The vessel receives the process fluid. The electrode is integral with an inner wall of the vessel. The diaphragm extends at least partially over the electrode and is configured to move relative to the electrode in response to the pressure of the process fluid. An electrical capacitance between the electrode and the diaphragm is related to the pressure of the process fluid.

26 Claims, 7 Drawing Sheets

U.S. PATENT DOCUMENTS

2004/0107762 A1* 6/2004 Silvis et al. .............. 73/1.06
2005/0145018 A1* 7/2005 Sabata et al. ............. 73/49.1

OTHER PUBLICATIONS

Xie et al., C.G.; "Electrical Capacitance Tomography for Flow Imaging: System Model for Development of Image Reconstruction Algorithms and Design of Primary Sensors," IEEE Proceedings, vol. 139, No. 1, Feb. 1992, pp. 89-98.

Bulletin IR-1 on Pressure Instrument Isolation Ring pp. 1-4.

Young et al., M.; "Development of A Variable Density Flowmeter for an Industrial Application Using Tomographic Imaging," IEEE Institute of Electrical Engineers, 1996, pp. 1-3.

Strizzolo, C.N.; and Converti, J.; "Capacitance Sensors for Measurement of Phase Volume Fraction in Two-Phase Pipelines," IEEE Transactions on Instrumentation and Measurement, vol. 42, No. 3, Jun. 1993, pp. 726-729.

"Invitation to Pay Additional Fees, Communication Relating to the Results of the Partial International Search" for PCT/US2005/005721.

"Notification of Transmittal of the International Search Report and the Written Opinion of the International Searching Authority" for PCT/US2005-005721.

* cited by examiner

IN-LINE ANNULAR SEAL-BASED PRESSURE DEVICE

BACKGROUND OF THE INVENTION

The present invention relates to a pressure sensor for measuring a pressure or a differential pressure related to a fluid flow. More particularly, the present invention relates to a pressure sensor using capacitive annular elements to measure pressure or the direction and flow rate of a fluid flow.

Pressure and fluid flow sensors can be used in many different applications. In industrial process control environments, for example, pressure sensors can be utilized to measure gauge pressure, absolute pressure and the like. Additionally, fluid flow sensors, for example, can be used to measure flow rates of process fluids and provide flow signals for flow indicators, controls, and flow volume metering. The term "fluid" as it is used herein refers to both liquids and gases, and their combination.

Differential pressure flow sensors measure the fluid flow rate in a pipe, vessel or conduit by measuring a pressure drop across a discontinuity within the pipe. One way to form the discontinuity is to place a flow restriction member or primary element within the pipe to produce the desired pressure drop. One such flow restriction member is an orifice plate that restricts the fluid flow and produces the measured pressure drop.

Typical flow rate measuring systems tap the pipe containing the fluid flow on either side of the flow restriction member, measure the pressure at each tap, and use an external pressure sensor to obtain the pressure drop. Impulse or gauge lines filled with fluid communicate the pressure at each tap to the external pressure sensor.

Such systems have relatively high installation costs due to the need to attach an external pressure sensor to the pipe. Moreover, it is necessary in such systems to provide additional leakage protection at the locations where the pipe is tapped, adding to the installation costs both in terms of installation time and material costs.

In some instances, the process fluid or gas being sensed by the pressure sensor may require a highly pure or ultra-pure environment. One technique to address such installation requirements is to separate the pressure sensor from the process fluid using an isolation diaphragm. Typically, an oil fill couples the pressure sensor to the isolation diaphragm such that pressure applied to the diaphragm is applied to the pressure sensor. However, this isolation technique can introduce errors in pressure measurements. Additionally, in highly pure process environments, if the diaphragm were to become damaged or the seal were to become damaged (either through corrosion or through collisions with particulate matter within the fluid flow), the entire process could become contaminated by the oil fill. In the case of silicon wafer fabrication, the flow meter must be dry, that is, with no fill fluid to transport the pressure signal.

SUMMARY OF THE INVENTION

A pressure sensor for measuring a pressure of a process fluid in a pipe has an electrode and a diaphragm. The electrode is integral with an inner wall of the pipe. The diaphragm extends at least partially over the electrode and is configured to move relative to the electrode in response to the pressure of the process fluid. An electrical capacitance between the electrode and the diaphragm is related to the pressure of the process fluid.

DETAILED DESCRIPTION

Pressure sensors are used in industrial processes to monitor and/or responsively control the process. Various industrial processes require ultra-high purity for all wetted materials (i.e., materials which are exposed to the process fluid). For example, some processing steps used in the semiconductor industry require ultra-high purity handling procedures for the process fluids. The semiconductor industry follows specifications set forth by SEMI (Semiconductor Equipment and Materials Institute, Inc.) for ultra-high purity material handling. These guidelines set forth acceptable materials and surface conditions for those elements which interface directly with the process media. There are other standards and industries which require ultra-high purity practices, such as the pharmaceutical industry.

Those industries that require ultra-high purity practices for handling the process fluid tend to resist the introduction of new materials or surfaces into the processes. Typically, the use of new materials requires a long certification and testing process. Following certification, the industry must develop a level of confidence that the new material or surface does not add impurities to the process.

In general, pressure transmitters which are currently used to measure pressures in ultra-high purity processes have some levels of errors in their pressure measurements. One source of errors is the requirement that the pressure sensor comply with ultra-high purity practices. This may require the introduction of an isolation diaphragm which physically isolates the pressure sensor from the process fluid. Another source of errors is simply due to the configuration and characteristics of the pressure sensor. The present invention provides a technique for using highly accurate elongate pressure sensors preferably for use in ultra-high purity processes.

The present invention is an in-line, pressure capacitive sensor. In one embodiment, the sensor measures differential pressure to determine the flow rate. This illustrative system utilizes an upstream measurement taken by a first capacitive sensor and a downstream measurement taken by a second capacitive pressure sensor. The two measurements are then subtracted to obtain a differential pressure, which is proportional to the flow rate of the fluid.

According to one embodiment of the present invention, a thin diaphragm is formed and welded onto an inner surface of a pipe over an insulator with a fixed capacitor plate. The diaphragm is oriented in a ring shape and attached around an entire circumference of the inner radius of the pipe. As pressure in the pipe changes, the diaphragm moves relative to the fixed capacitor plate formed on the insulator. The insulator may be formed from glass or from any other electrically insulative material. The movement of the concentric diaphragm is registered as a capacitance change directly due to the distance change between the diaphragm and the fixed capacitor plate.

Figure 1:
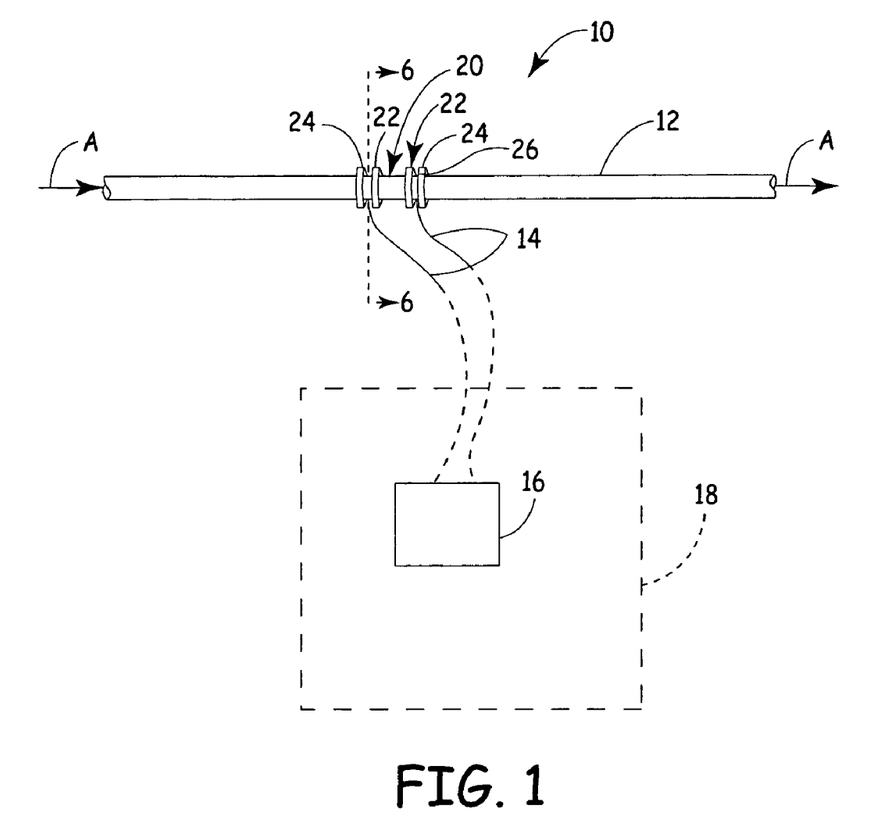
FIG. 1 is a simplified block diagram showing a pressure sensor attached in-line with the fluid to a pipe in a process plant.

FIG. 1 depicts an example of a processing plant and illustrates an environment in which the capacitive, differential flow sensor 10 of the present invention can be used. Flow sensor 10 is installed in-line with pipe 12. A fluid flows through the pipe 12 in the direction indicated by Arrows (A). The flow sensor 10 senses a fluid pressure drop, which can be used to determine the flow rate of a fluid flow through pipe 12. The term "fluid" and the phrase "fluid flow" are used herein to indicate both liquids and gases. Thus the fluid flow can be of liquid or gas.

Flow sensor 10 can be electrically coupled via leads 14 to control system 16 or to other processing electronics. Such electrical coupling may occur over two-wire control loop 14, a wireless communication link, or via any communication means. Control system 16 is typically remotely located in a control room 18 of the processing plant. Alternatively, control system 16 may be distributed such that the control system 16 exists in more than one location (control room 18 shown in phantom).

Control system 16 can be configured to monitor flow-related information received from the flow sensor 10 and/or to control the flow sensor 10 via the communications link.

The flow rate signal produced by flow sensor 10 is indicative of the flow rate of the fluid flow as well as its direction. For example, if the flow rate signal is an analog signal (4–20 mA), the flow rate and the direction of the fluid flow can be indicated by the magnitude of the signal. For example, a flow rate of zero can be indicated by a current magnitude of 12 mA. A fluid flow moving in a negative direction, or a negative fluid flow, can be indicated by a flow rate signal having a current magnitude of less than the 12 mA "zero flow rate" magnitude. A positive fluid flow can be indicated by a flow rate signal having a current magnitude that is greater than the 12 mA "zero flow rate" magnitude. The difference between of the magnitude of the flow rate signal and the zero flow rate magnitude can be used to establish the flow rate of the positive or negative fluid flows. For example, an increase in the difference between magnitude of the flow rate signal and the zero flow rate magnitude could indicate an increase in the flow rate of the positive or negative fluid flow.

Though it is difficult to see the details of the embodiment shows in FIG. 1, the sensor element flow sensor 10 is comprised of two annular capacitive sensor rings, connected by a flow restrictive segment 20 (pressure dropping element) to the pipe 12 via flanges 22. The flanges 22 of the pipe 12 and the flow restrictive segment 20 are connected using a fastening element 26. The fastening element 26 may be any fastening means, such as rivets, bolts, screws and nuts, and the like. In a preferred embodiment, the fastening element 26 is threadably attached through openings on the flange 22 of the restrictive segment 20 and through corresponding openings provided on the flange 22 of the pipe segment 12, such as with a bolt and a nut.

Figure 2:
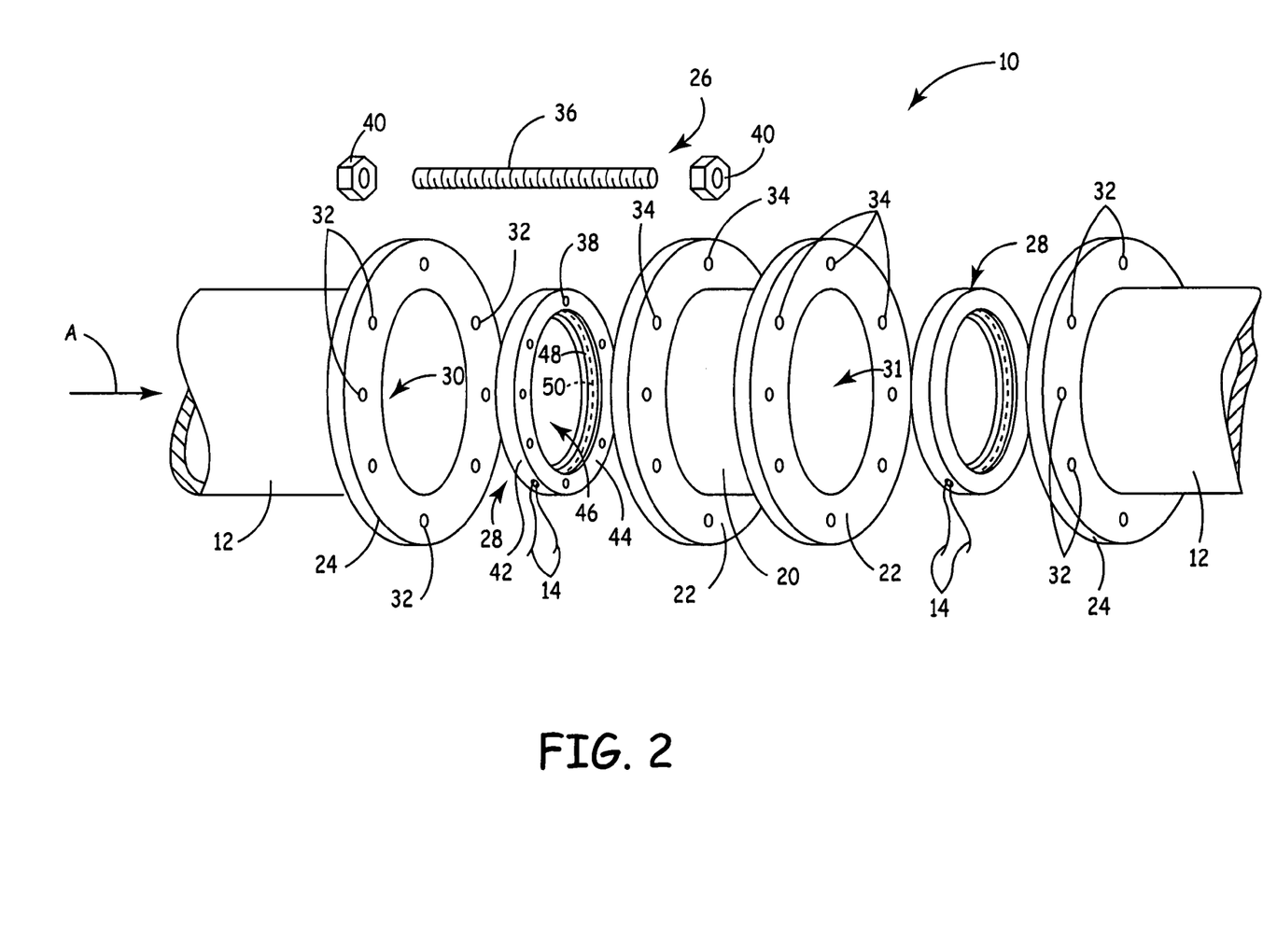
FIG. 2 is a disassembled and magnified view of the pressure sensor of FIG. 1.

As shown in FIG. 2, the sensor element 10 has two capacitive pressure sensors 28 separated by a flow restrictive segment 20. As shown, in this embodiment, pipe 12 is provided with a flange 24, formed integrally with the pipe 12 and having an opening 30 having the same diameter as the corresponding pipe segment 12. Thus, both segments of pipe 12 terminate in a flange 24 with an opening 30.

The pipe flanges 24 and the flanges 22 are provided with fastener openings 32 and 34, respectively. Each fastener opening 32, 34 extends entirely through the flange 24, 22 and is sized to receive a fastener 36. The fastener can be extended through an opening 32 on the pipe flange 24, through an opening 38 on the capacitive pressure sensor 28, and through a corresponding opening 34 provided on the flange 22 of the flow restrictive element 20. The threaded fastener 36 may then be fixed in place using lock nuts 40, which can be tightened onto the threaded fastener. It is appreciated that other fastening methods including welding may be utilized.

In this example, the capacitive pressure sensor 28 is an annular ring having a housing 42 and a flange assembly 44, which define an opening 46 designed to be positioned in-line with the fluid flow (A) and sized to mate with the opening 30 of the pipe 12. The flange assembly 44 has openings 34 sized to receive the threaded fastener 36 (as previously discussed). A flexible cylinder or diaphragm 48 extends the entire circumference of the inside wall of the annular ring shaped sensor 28. A capacitive element 50 is provided within an insulated substrate (shown in FIG. 3) positioned between the diaphragm and the inside wall of the annular ring shaped pressure sensor 28.

As process fluid flows through the assembly, pressure causes the diaphragm to move, which registers as a change in capacitance. Effectively, pressure is transmitted through 360° of the diaphragm. The change in capacitance can then be transmitted via electrical signals on leads 14.

Since the capacitive diaphragm extends 360° around the interior of the sensor 28 and since the opening 46 is sized to fit the opening 30 of the pipe segment 12, there is no place for solids to collect and no openings to plug. The flowing process continually cleans the diaphragm 48, assuring reliable and accurate pressure readings.

In the embodiment of a differential pressure flow meter, the flow restrictive segment 20 may be provided with a flow restrictive element (shown in FIG. 3), which effectively narrows the flow path of the fluid flow, causing the pressure to drop across the restrictive element. The two sensors 28 then measure pressures on either side of the restrictive element, and their measurements may be subtracted to determine a differential pressure.

Figure 3:
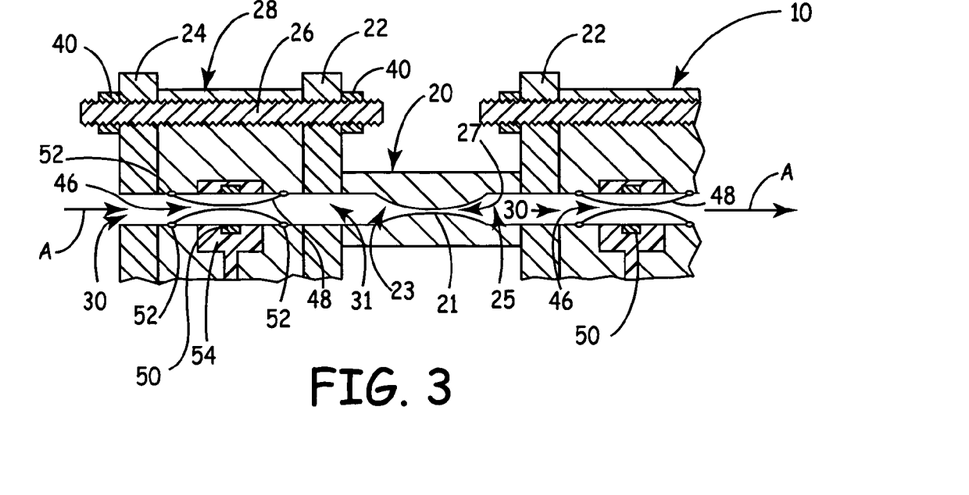
FIG. 3 is a simplified, cross-sectional depiction of an in-line, capacitive differential pressure flow sensor of the present invention in situ.

FIG. 3 shows a simplified illustration of one embodiment of flow sensor 10 within pipe 12. Flow sensor 10 generally includes a flow restriction segment 20 sandwiched between two capacitive pressure sensors 28. The pressure sensors 28 and the flow restriction segment 20 are positioned in-line with the fluid flow (A).

As shown, flange 24 from a pipe segment 12 is releasable attached to flange 22 from a flow restrictive segment 20 via a threaded fastener 36 with nuts 40 on both ends. A capacitive pressure sensor 28 is positioned between the pipe 12 and the flow restrictive segment 20, and more particularly, between the flange 24 and the flange 22. The opening 46 of the sensor 28 matches the openings 30, 31 of the flanges 24 and 22, respectively. Thus, the connections between the pipe 12, the sensor 28 and the flow restrictive segment 20 are machined to match almost precisely.

The flexible diaphragm 48 is attached to the inside wall of sensor 28, and extends away from the inside wall and into the fluid flow. The diaphragm 28 may be attached by welding or by other known attachment methods, provided the seal forming and welding technology satisfies the requirements of the ultra pure process. The weld points are exaggerated so that they can be viewed and are indicated by reference numeral 52. In general, the weld point 52 will preferably be very small.

In a preferred embodiment, the diaphragm 48 is attached to the pipe 12 using a resistance scan welding technique. In another preferred embodiment, the diaphragm 48 is attached to the pipe 12 using a laser welding technique. An additional electro-polishing process may be used to refine the surface, depending on the finish required by the process specifications. In general, any attachment technique capable producing a sealed attachment and capable of maintaining the seal under fluid pressure may be used.

An insulator 54 is provided within the inside wall of the sensor 28, and a capacitive lead 50 is positioned on the insulator 54. Electrical leads 14 extend from the capacitive lead 50 and out from the sensor 28 through the insulator 54. A deflection of the diaphragm 48 caused by the pressure of the fluid flow will be read as an electrical signal from the leads 14.

By providing openings on the flange assembly 44 of the sensor 28, the openings 30 and 31 of the pipe flange 24 and the flow restrictive segment flange 22 mate with the opening 46 of the sensor 28, without the need for positional adjustment by the field worker.

Finally, it should be noted that the flow restrictive segment 20 has a flow restriction element 21, which narrows the fluid flow path. Specifically, the fluid flow (A) advances toward throat portion 23, through the narrow passageway 27 toward throat portion 25. The narrow passageway 27 extends between the symmetric throat portions 23, 25. It is appreciated that the flow restriction element may be one of many such types known in the art including an orifice plate, Venturi or laminar flow element.

On the upstream side of the flow restriction element 21, pressure increases, and on the downstream side of the element 21, the pressure decreases. Thus the flow restriction element can be considered a "pressure dropping element", and the capacitive sensors 28 are positioned to measure an upstream pressure and a downstream pressure so as to determine the pressure differential across the pressure dropping element.

Figure 4:
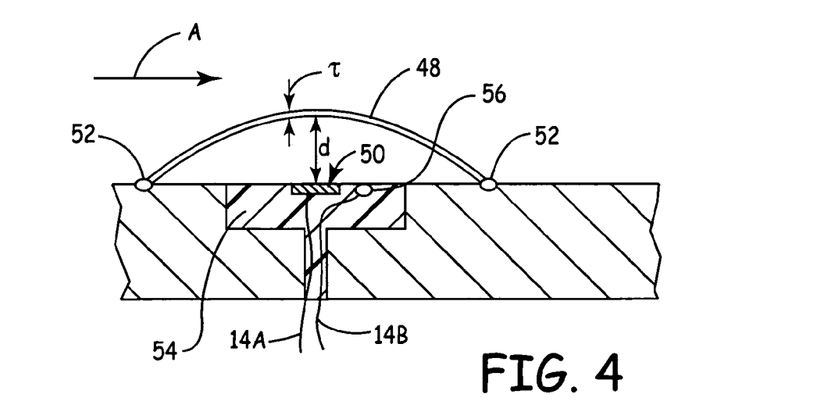
FIG. 4 is a simplified, magnified view of the capacitive element.

FIG. 4 illustrates an expanded view of the capacitive element of the sensor 28. As shown, a capacitive lead 50 is formed on a surface of the insulator 54. The insulator 54 may be formed from glass, ceramic or from any other electrically insulative material.

The diaphragm 48 is preferably formed from a conductive material, and is electrically grounded to the surface of the sensor 28 and indirectly to the pipe 12. In this manner, the capacitance is measured based on the potential difference between the capacitive lead 50 and a relative ground of the diaphragm 48, separated by a distance (d). The resulting capacitance is calculated according to the following equation:

$$C = \frac{\varepsilon_0 A}{d} = \frac{\varepsilon_0 2\pi RW}{d},$$

where R is inner radius of the opening 46, W is the width of the capacitive electrode 50 in the direction of the fluid flow (A), and d is the average displacement of the diaphragm relative to the capacitive electrode 50. Thus, the change in capacitance is measured around the entire 360° of the inside of the sensor 28.

Finally, leads 14 are shown as electrical lead 14A and temperature sensor lead 14B. Depending on the specific embodiment, the leads 14A and 14B may need to shielded so as to guard against stray capacitances. Specifically, if electronics are separate from the sensor, the wire may need to be shielded and a drive circuit may be necessary to balance the capacitance. If the electronics are included in the sensor, then the leads 14A and 14B may not need to be shielded (at least within the sensor housing).

As shown, a temperature sensor 56 is provided to sense a temperature of the sensing elements, in order to control for temperature related errors. The temperature sensor 56 may be a resistance-type temperature sensor or a thermistor. The temperature sensor 56 may be embedded within the insulative material 54 or may be close coupled to the outside of the pipe (shown in FIG. 7).

It should be noted that for use within an ultra pure process, a dry sensor is desired. In other words, unlike prior art in-line sensors, no fluid or gas is provided as a dielectric between the diaphragm 48 and the capacitive electrode 50. Preferably, the diaphragm 48 seals the capacitive electrode 50 and insulator 54 from the fluid flow and is sufficiently strong to maintain a vacuum. Thus, if the seal of the diaphragm 48 were to corrode or if the diaphragm were to become damaged, no pollutant or contaminant would leak into the process flow.

In the embodiment shown, since the diaphragm 48 extends around an entire inner circumference of the pipe 12, the pressure on the diaphragm 48 is evenly distributed, making it possible to use thinner diaphragms. Additionally, since there is no concern regarding particulates damaging the diaphragm (since the present invention is intended for use in ultra-pure processes), it is possible to use relatively thin diaphragms 48. The thinner diaphragm 48 is generally more sensitive to pressure variations, allowing for improved accuracy. Thus, the thickness (τ) of the diaphragm 48 is partially dependent on the balancing of pressures (forces) on the diaphragm.

If the diaphragm 48 extends in a ring-like configuration around the inside of the pipe 12, a thin diaphragm 48 will work. However, if the diaphragm extends a portion of the way around the inside of the pipe, a thicker diaphragm 48 may be required. Additionally, it may be necessary to place a second capacitive sensor opposite a first sensor in order to acquire a reasonably accurate measurement. Finally, it may be possible to place a plurality of capacitors in a ring-shaped configuration around the inside of the pipe 12 in order to achieve a plurality of pressure readings around the entire inner diameter.

Figure 5:
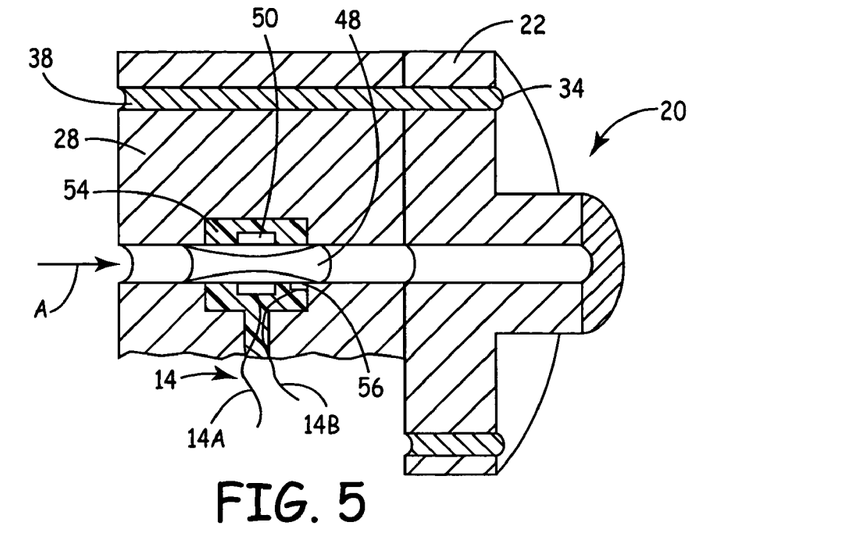
FIG. 5 is a longitudinal cross-section view of the capacitive sensor in situ.

FIG. 5 shows a perspective cross-section illustrating that the diaphragm 48 of the sensor 28 preferably extends 360° around the inner surface of the capacitive sensor 28. An insulator 54 is provided with a capacitive electrode 50. The insulator 54 and the electrode 50, like the diaphragm 48, extend around the entire inner surface of the sensor 28, providing a 360° capacitive sensor. In this embodiment, the temperature sensor 56 is positioned within the insulator 54, providing a temperature of the sensor body.

Figure 6:
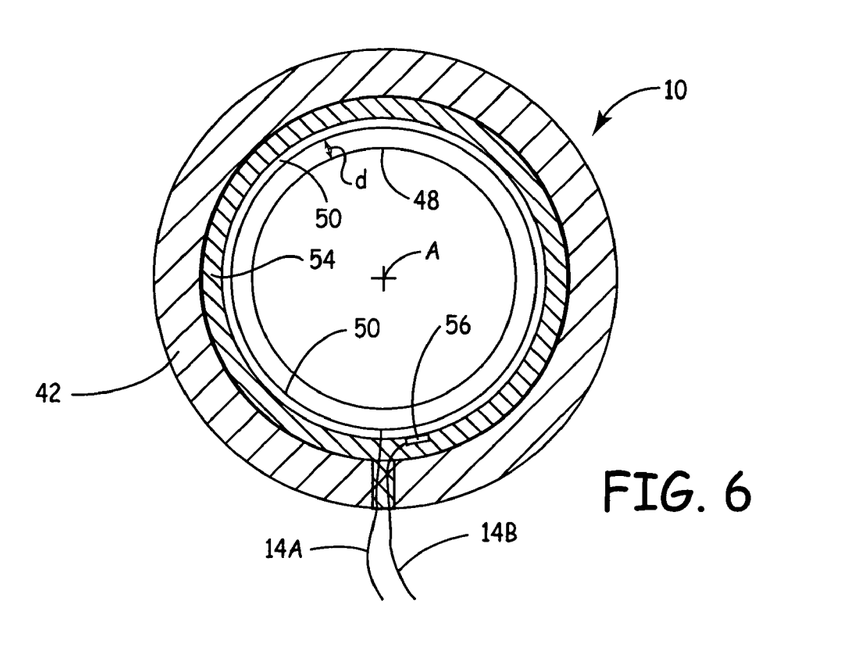
FIG. 6 illustrates a cross-sectional view of a capacitive pressure sensor taken along line 6—6 in FIG. 1.

FIG. 6 shows a cross-sectional view of the sensor body 42 of one embodiment of the present invention. As shown, the insulative element 54 extends around the entire inner surface of the housing. A capacitive electrode 50 is disposed on top of the insulative element (for illustration purposes only). In actuality, the capacitive electrode 50 would be embedded within or recessed into the surface of the insulative element 54. The diaphragm 48 extends 360 degrees around the inside of the housing 42 and separated by a distance (d) from the capacitive element 50.

In this embodiment, the temperature sensing element 56 is positioned within the insulate element 54. An electrical lead 14A connects the capacitive electrode to a larger network, and temperature lead 14B connects the temperature sensor 56 to the larger network.

As described herein, the term "lead" may include more than one wire, such that leads 14A and 14B may each be two wire loops. It will be understood that FIGS. 1–6 provide illustrations of the invention, but are not necessarily drawn to scale. Some elements are exaggerated in order to make them more readily viewable. Additionally, with respect to FIG. 5, for example, only a portion of the sensor 28 is shown for simplicity. It is further appreciated that, although one embodiment is shown using two sensors to measure differential pressure, one sensor could be used to measure absolute or gauge pressure.

Figure 7:
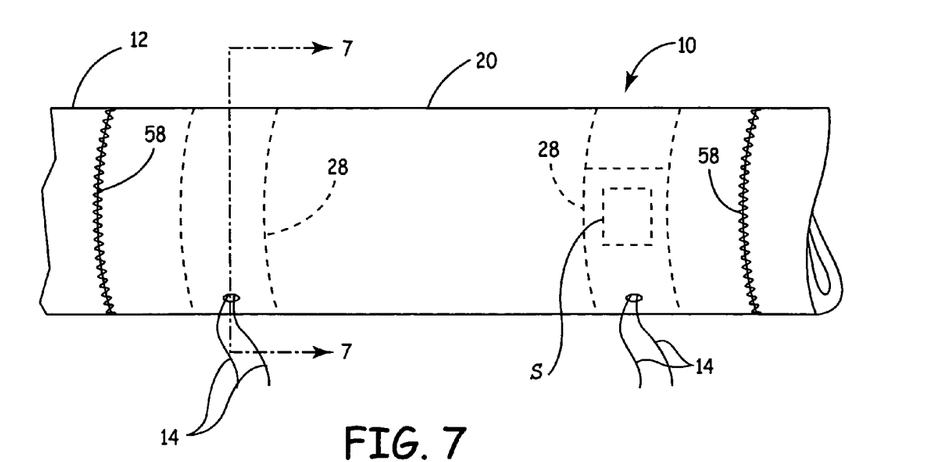
FIG. 7 is side view of an alternative embodiment of the capacitive pressure sensor of the present invention.

FIG. 7 presents an alternative embodiment of the flow sensor 10, wherein the capacitive sensors 28 are formed with the flow restriction segment 20 as a single unit. In this instance, the connection with the pipe 12 may be a weld joint 58 instead of a flange. Additionally, assembly of the flow sensor 10 may require additional welding.

Figure 8:
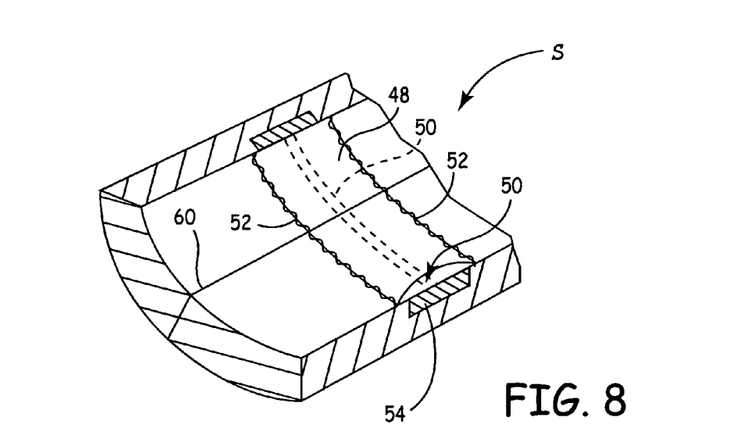
FIG. 8 is a magnified view of a cut out portion of the capacitive pressure sensor taken from an area indicated by dotted square (S) in FIG. 7.

FIG. 8, for example, illustrates a section cut from the flow sensor 10 of FIG. 7 corresponding to box S. As shown, a weld seam 60 extends longitudinally in the direction of flow. A corresponding weld seam would exist on the other side of the sensor 28. In this embodiment, the diaphragm 48, the capacitive electrode 50 and the insulator 54 each may need to be assembled as two pieces, attached to each longitudinal half of the housing 42 before the halves are welded together. The weld seams 52 of the attachment of the diaphragm 48 to the inside wall of the sensor housing 42 are exaggerated.

Figure 9:
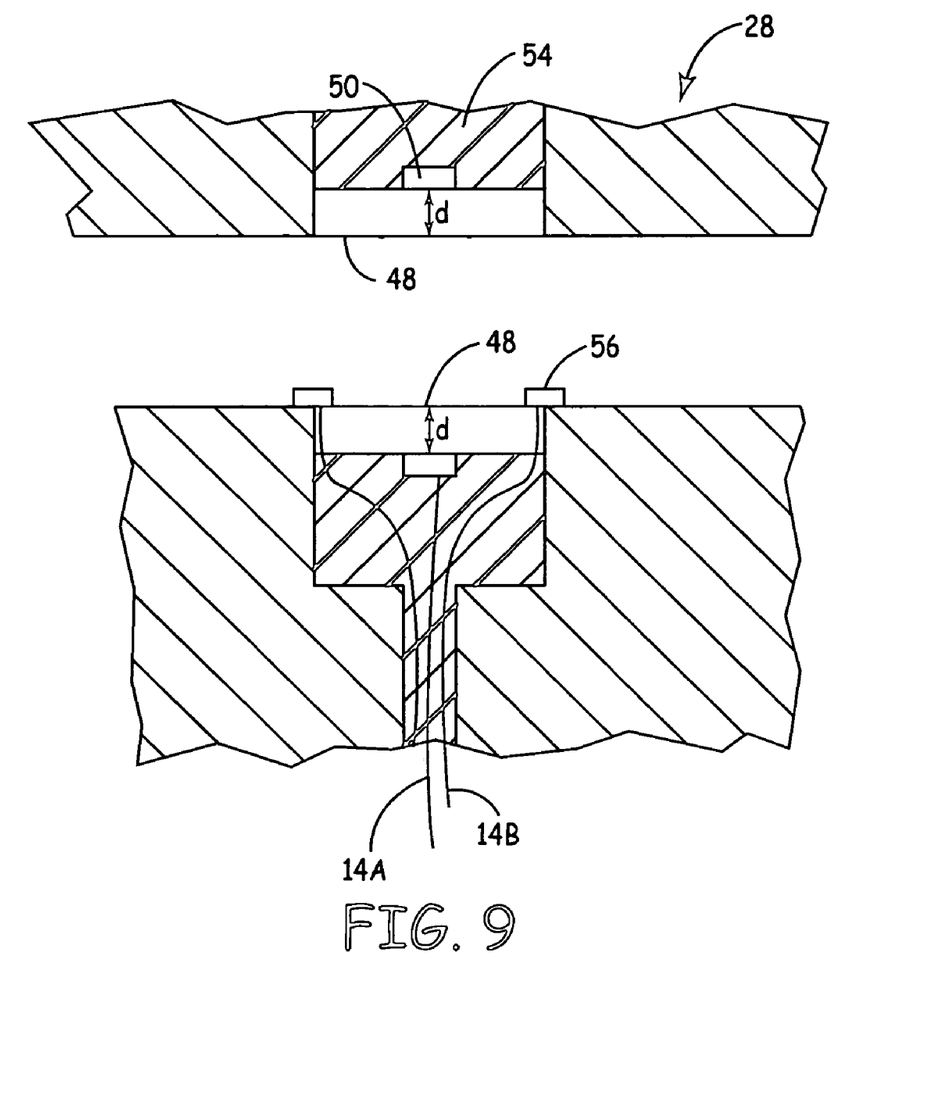
FIG. 9 is an alternative embodiment of the present invention wherein the diaphragm is machined to be flush with inner surface of the sensor and the insulator and capacitive electrode are recessed from the surface.

FIG. 9 is another embodiment of the invention. As shown, the diaphragm 48 is formed as continuous with the surface of the inside of the sensor 28. In this embodiment, the insulator 54 is recessed away from the flow path and the capacitive electrode 50 is embedded into and flush with the surface of the insulator. In this way, the capacitive electrode 50 is separated from the diaphragm 48 by a distance (d), and deflection of the diaphragm again alters the capacitance. In particular, deflection of the grounded diaphragm 48 changes the distance between the diaphragm 48 and the capacitive electrode 50, resulting in a signal representative of the pressure of the fluid flow.

In the prior art, such recessed cavities would be filled with fill fluid for transmitting pressure to a pressure sensor. Since this invention is intended for use in ultra pure processing environments, such fill fluid represents a potential contaminant. Instead, the dielectric between the diaphragm 48 and the capacitive electrode 50 is preferably a vacuum.

A temperature sensor 56 extends through the insulative material and onto the diaphragm for sensing fluid flow temperature. Alternatively, the temperature sensor may be placed at other locations within the sensor.

As with the previously discussed embodiments, the embodiment of FIG. 9 extends 360° around the entire inner surface of the sensor element 28, providing for a 360° capacitive measurement of the fluid flow pressure.

In general, it should be understood that the flow restriction segment 20 is bi-directional, forming a discontinuity within the fluid flow which produces a pressure drop within the fluid flow as the fluid moves past the obstruction (flow restrictive element 21. A pressure drop occurs is measured from a first sensor to a second sensor across the flow restrictive element 21. A positive pressure drop is measured when the pressure at a first sensor 28 is greater than the pressure at a second sensor 28. The positive pressure drop relates to a positive fluid flow or a fluid flow moving from left to right or from first sensor 28 to a second sensor 28. A negative pressure drop occurs when the pressure at first sensor 28 is less than the pressure at second sensor 28. The negative pressure drop relates to a negative fluid flow or a fluid flow moving from right to left or from second sensor to a first sensor. The greater the magnitude of the pressure drop the faster the flow rate of the fluid flow. As a result, the pressure drop is indicative of both the direction of the fluid flow and its flow rate. Those skilled in the art will appreciate that many different forms of flow restriction segment 20 could be used to produce the desired pressure drop. These include, for example, orifice plates having concentric and eccentric orifices, plates without orifices, wedge elements consisting of two non-parallel faces which form an apex, or other commonly used flow restriction members.

Thus, in a differential pressure embodiment, flow sensor 10 integrates the capacitive pressure sensors 28 with the flow restriction segment 20 to form a single unit which can be positioned in-line with a fluid flow.

Referring again to FIG. 1, differential pressure flow sensor 10 measures the pressure drop across flow restriction member 20 by coupling capacitive pressure sensors 28 to the pressures on both sides of the flow restrictive element 21. In general, the Differential pressure flow sensor 10 produces a pressure signal, which is indicative of the pressure drop across the restrictive element 21 and which can be provided to processing electronics to calculate the flow rate of the fluid flow.

Since the flow sensor 10 of the present invention does not use impulse lines or fill fluid, the flow sensor 10 is insensitive to position. As a result, this embodiment of differential pressure flow sensor 10 can be moved without having to recalibrate.

It will be understood by a worker skilled in the art that the capacitive pressure sensor of the present invention may also be configured to measure absolute pressure, gauge pressure and the like. Similarly, since the sensor does not utilize impulse lines or fill fluid, the capacitive sensor is insensitive to position. Consequently, the capacitive pressure sensor can be moved without requiring recalibration.

Figure 10:
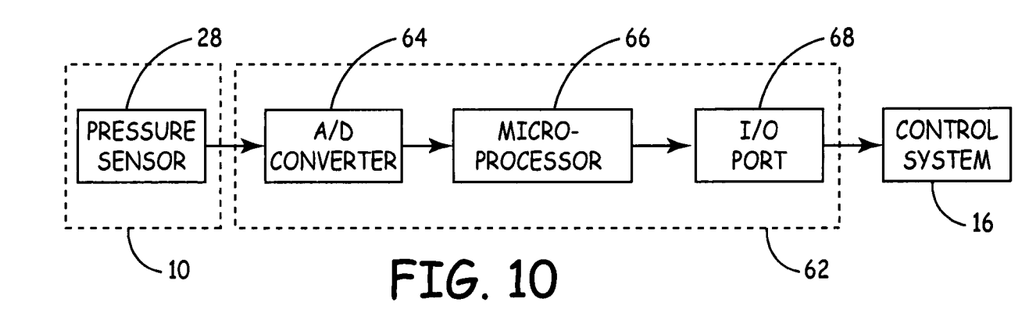
FIGS. 10 and 11 are simplified block diagrams of circuitry used to perform flow rate calculations in accordance with various embodiments of the invention.

FIG. 10 shows a simplified block diagram of one embodiment of processing circuitry 62 used by the present invention to produce a flow rate signal that is indicative of the direction and flow rate of the fluid flow. Here, capacitive pressure sensor 28 provides processing electronics 62 with the pressure signal that is indicative of the pressure drop across flow restriction segment 20. Processing electronics 62 generally includes analog-to-digital (A/D) converter 64, microprocessor 66, and input/output (I/O) port 68. A/D converter 64 digitizes the pressure signal received from differential pressure sensor 28 and provides the digitized pressure signal to microprocessor 66. Microprocessor 66 is configured to establish the direction of the fluid flow by the sign of the pressure signal; either positive or negative. Microprocessor 66 is further configured to calculate the flow rate of the fluid flow as a function of the absolute value of the digitized pressure signal. For example, microprocessor 66 could use the following equations to calculate mass flow rate ($Q_m$) and volume flow rate ($Q_v$):

$$Q_m = NC_dY\frac{d^2}{\sqrt{1-\beta^4}}\sqrt{\rho h} \qquad Q_v = NC_dY\frac{d^2}{\sqrt{1-\beta^4}}\frac{\sqrt{h}}{\sqrt{\rho}}$$

Where:
$Q_m$=mass flow rate
$Q_v$=volumetric flow rate
N=Units conversion factor (constant)
$C_d$=primary element discharge coefficient (relates to the geometry of the throat)
Y=gas expansion factor (Y=1.0 for liquids)
d=primary element throat diameter
$\beta$=primary element beta ratio (ratio of throat area to pipe area)
$\rho$=fluid density
h=absolute value of the differential pressure measured by differential pressure sensor 22.

Microprocessor 66 is further configured to produce a flow rate signal through I/O port 68 that is indicative of the direction and flow rate of the fluid flow. The flow rate signal can be delivered to a control system 16 (FIG. 1), as previously discussed.

In one aspect of the invention, the differential pressure signal produced by capacitive pressure sensors 28 is provided as an output, which can be used to correct for errors, such as those due to spikes in the measurements. Such spikes can be problematic when using the invention to measure piston position in hydraulic systems as a function of flow of hydraulic fluid.

Figure 11:
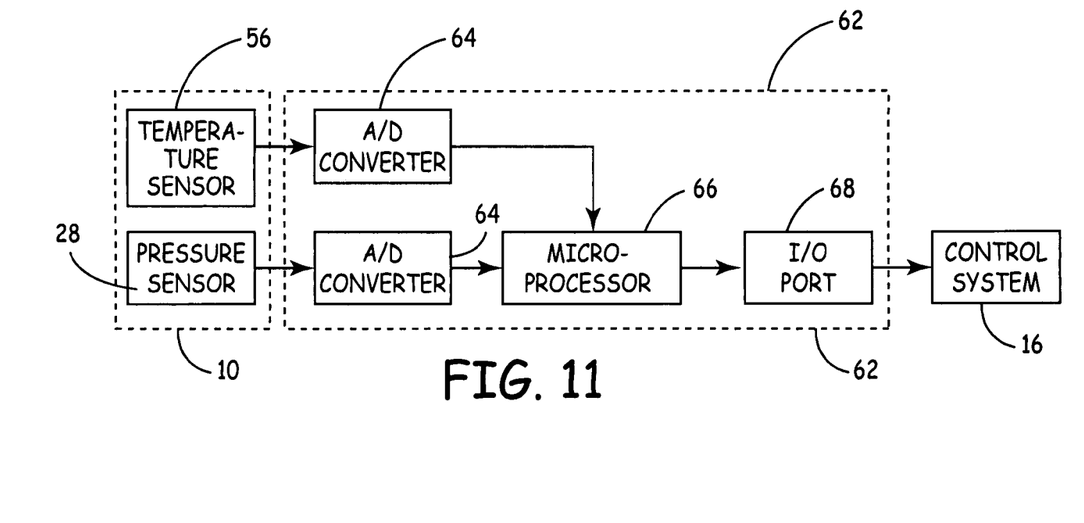

As shown in FIG. 11, another embodiment of flow sensor 10 includes temperature sensor 56, which can be used to measure the temperature of the fluid flow and/or the operating temperature of capacitive pressure sensor 28. Temperature sensor 56 could be, for example, a resistive temperature detector (RTD) or other suitable temperature sensing device. Temperature sensor 56 is configured to produce a temperature signal that is indicative of the sensed temperature, which can be provided to processing electronics 62 at A/D converter 64. A/D converter 64 digitizes the temperature signal and provides the digitized temperature signal to microprocessor 66. Microprocessor 66 can be configured to use the digitized temperature signal to perform various fluid parameter calculations, such as viscosity and density calculations, the results of which can be used by microprocessor 66 to calculate the flow rate of the fluid flow. Additionally, microprocessor 66 can use the temperature signal to provide temperature compensation to the pressure signal received from capacitive pressure sensors 28. Microprocessor 66 can produce a flow rate signal that is indicative of the flow rate of the fluid flow as a function of the differential pressure signal and the temperature signal, that can be fed to other processing circuitry, such as to control system 16, through I/O port 68.

While the present invention has been discussed largely with respect to a single capacitive sensor extending around the inner circumference of the pipe, other capacitive sensors and arrangements of capacitors are contemplated. For example, the capacitive sensor could be formed from a plurality of capacitors aligned with one another and extending around the inner circumference of the pipe. Alternatively, the capacitor could extend around only a portion of the inner circumference of the pipe. In another embodiment, the capacitors could be arranged on opposing sides of the pipe, and so on.

While the present invention has been described with a flow restriction element separate from the capacitive pressure sensors, it may be possible to have the diaphragm of the capacitive pressure sensor serve as the flow restrictive element. In this embodiment, the capacitive sensor would have a different discharge coefficient and a different corresponding flow characterization.

In one embodiment, the differential flow meter is provided without a flow restriction element. The diaphragm 48 extends into the fluid flow from the wall of the pipe. In this embodiment, the diaphragm may need to be reinforced along a portion of the diaphragm so as to act as the flow restrictive element and so as to maintain the flow restriction. A portion of the diaphragm on either side of the reinforcement may deflect in response to the fluid pressure. This embodiment may also require a different flow characterization and discharge coefficient from the previous embodiments.

Although the present invention has been described with reference to preferred embodiments, workers skilled in the art will recognize that changes may be made in form and detail without departing from the spirit and scope of the invention. For example, any type of in-line configuration of the capacitive sensor can be used. Additionally, the present invention can be applied to both pressure (absolute, gauge, and the like) or differential pressure (flow) devices.

What is claimed is:

1. A pressure sensor for measuring a pressure of a process fluid, comprising:
    a contiguous electrically conductive vessel for receiving the process fluid;
    an electrical insulator extending over an inner wall of the electrically conductive vessel;
    an electrode integral with the electrical insulator; and
    a diaphragm that extends at least partially over the electrode and mates flush with the inner wall of the vessel and generally parallel with flow of process fluid through the vessel and that is configured to move relative to the electrode in response to the pressure of the process fluid;
    wherein an electrical capacitance between the electrode and the diaphragm is related to a pressure of the process fluid and wherein the diaphragm defines a cavity between the diaphragm and the electrode, the cavity containing a vacuum.

2. The pressure sensor of claim 1 wherein the insulator and electrode extend partially around the inner wall of the vessel.

3. The pressure sensor of claim 2 wherein the diaphragm extends partially around the inner wall of the vessel.

4. The pressure sensor of claim 1 and further comprising:
    a temperature sensor integral with the inner wall to measure a fluid temperature and to generate a temperature signal indicative of the fluid temperature.

5. The pressure sensor of claim 4 and further comprising:
    processing electronics adapted to produce a pressure signal that is a function of the temperature signal.

6. The pressure sensor of claim 1 wherein the insulator and electrode extend completely around the inner wall of the vessel.

7. The pressure sensor of claim 6 wherein the diaphragm extends completely around the inner wall of the vessel.

8. The pressure sensor of claim 1 and further comprising:
a measurement circuit adapted to produce a pressure signal based on the electrical capacitance.

9. The pressure sensor of claim 1 and further comprising:
a wireless transceiver mounted to a housing and electrically connected to the electrode to wireless transmit the pressure signal.

10. The pressure sensor of claim 1 wherein the electrode and the diaphragm form a first capacitor, and further comprising:
a flow restrictive element extending from the inner wall of the vessel into the process fluid; and
a second capacitor having a second electrode integral with the inner wall and a second diaphragm that extends at least partially over the second electrode and that is configured to move relative to the second electrode in response to the pressure of the process fluid.

11. The pressure sensor of claim 1 wherein the diaphragm extends away from the inner wall into the process fluid.

12. The pressure sensor of claim 1 wherein the diaphragm is flush with the inner wall of the vessel and the insulator and electrode are recessed into the inner wall.

13. The pressure sensor of claim 1 wherein the electrical insulator comprises glass.

14. The pressure sensor of claim 1 wherein the electrical insulator comprises ceramic.

15. The pressure sensor of claim 1 wherein the diaphragm is sealed to the vessel by a weld.

16. A differential pressure sensor for measuring a differential pressure of a process fluid in a conduit, comprising:
a flow restriction element integral with a conductive inner wall of the conduit and adapted to produce a pressure drop when placed in-line with a fluid flow;
a first electrical insulator integral with a contiguous section of the conductive inner wall of the conduit;
a first capacitor having a first capacitance and including a first electrode integral with the first electrical insulator and positioned upstream from the flow restriction element and in-line with the process fluid the first capacitor comprising a first dielectric between the first electrode and a second electrode;
a second electrical insulator integral with the contiguous section of the conductive inner wall of the conduit;
a second capacitor having a second capacitance and including a third electrode integral with the second electrical insulator and positioned downstream from the flow restriction element and in-line with the process fluid the second capacitor comprising a second dielectric between the third electrode and a fourth electrode;
wherein the first capacitance and the second capacitance are related to the differential pressure of the process fluid and wherein each of the first dielectric and the second dielectric is a vacuum.

17. The differential pressure sensor of claim 16, further comprising:
processing electronics adapted to produce a flow rate signal that is indicative of a direction and a flow rate of the process fluid as a function of the first and the second capacitances.

18. The differential pressure sensor of claim 16, wherein the first capacitor comprises:
a diaphragm that extends at least partially over the first electrode and that is configured to move relative to the first electrode in response to the pressure of the process fluid;
wherein the first capacitance is between the first electrode and the diaphragm and is related to the pressure of the process fluid.

19. The differential pressure sensor of claim 18 wherein the diaphragm is sealed to the conduit by a weld.

20. The differential pressure sensor of claim 16 wherein the flow restriction element has a narrow fluid flow passageway extending between symmetric first and second throat portions.

21. The differential pressure sensor of claim 16, further comprising:
a temperature sensor adapted to sense at least one of a temperature of the fluid flow and an operating temperature of the pressure sensor and to produce a temperature signal that is indicative of the sensed temperature.

22. The differential pressure sensor of claim 21 wherein a flow rate signal is a function of the temperature signal.

23. The differential pressure sensor of claim 16 wherein each of the first capacitor and the second capacitor extend at least partially around the inner wall of the conduit.

24. The differential pressure sensor of claim 16 wherein each of the first capacitor and the second capacitor extend entirely around the inner wall of the conduit.

25. The differential pressure sensor of claim 16 wherein the first electrical insulator and the second electrical insulator comprises glass.

26. The differential pressure sensor of claim 16 wherein the first electrical insulator and the second electrical insulator comprises ceramic.

* * * * *